US012572579B2

(12) United States Patent
Dhulipala et al.

(10) Patent No.: US 12,572,579 B2
(45) Date of Patent: Mar. 10, 2026

(54) LARGE LANGUAGE MODEL BASED SYSTEM UPGRADE CLASSIFIER

(71) Applicant: Rubrik, Inc., Palo Alto, CA (US)

(72) Inventors: Chandrashekhar Dhulipala, Sunnyvale, CA (US); Anuj Dhawan, Mountain View, CA (US); Muraliraja Muniraju, Fremont, CA (US); Seungyeop Han, San Jose, CA (US); Swati Bararia, Redmond, WA (US)

(73) Assignee: Rubrik, Inc., Palo Alto, CA (US)

( * ) Notice: Subject to any disclaimer, the term of this patent is extended or adjusted under 35 U.S.C. 154(b) by 2 days.

(21) Appl. No.: 18/739,114

(22) Filed: Jun. 10, 2024

(65) Prior Publication Data

US 2025/0378103 A1 Dec. 11, 2025

(51) Int. Cl.
| | |
|---|---|
| *G06F 16/35* | (2025.01) |
| *G06F 16/16* | (2019.01) |
| *G06F 16/3329* | (2025.01) |

(52) U.S. Cl.
CPC ............ *G06F 16/35* (2019.01); *G06F 16/164* (2019.01); *G06F 16/3329* (2019.01)

(58) Field of Classification Search
CPC ..... G06F 16/35; G06F 16/164; G06F 16/3329
USPC ........................................ 707/737
See application file for complete search history.

(56) References Cited

U.S. PATENT DOCUMENTS

| | | | | |
|---|---|---|---|---|
| 6,966,015 | B2 * | 11/2005 | Steinberg .............. | H04L 41/064 |
| | | | | 714/26 |
| 11,361,155 | B2 * | 6/2022 | Chou ................... | G06F 21/6227 |
| 11,436,285 | B2 * | 9/2022 | Brar .................... | G06F 11/3409 |
| 11,770,398 | B1 * | 9/2023 | Erlingsson .......... | G06F 16/3329 |
| | | | | 709/224 |
| 12,210,839 | B1 * | 1/2025 | Burton ................. | G06T 11/206 |
| 2012/0137367 | A1 * | 5/2012 | Dupont ................. | G06F 21/00 |
| | | | | 726/25 |
| 2013/0081142 | A1 * | 3/2013 | McDougal ............ | G06F 21/577 |
| | | | | 726/24 |
| 2022/0245245 | A1 * | 8/2022 | Annen .................. | G06N 20/00 |
| 2022/0247760 | A1 * | 8/2022 | Shanker .............. | G06F 9/45558 |
| 2022/0318203 | A1 * | 10/2022 | Kotwal ................ | G06F 16/188 |
| 2022/0405172 | A1 * | 12/2022 | Gotkhindikar ...... | G06F 11/1461 |

OTHER PUBLICATIONS

Beran, Michal, et al., "Exploratory Analysis of File System Metadata for Rapid Investigation of Security Incidents", VizSec 2020, Salt Lake City, UT, Oct. 28, 2020, pp. 11-20.*

* cited by examiner

*Primary Examiner* — Robert Stevens
(74) *Attorney, Agent, or Firm* — Rimon Law, P.C.

(57) ABSTRACT

Methods, systems, and non-transitory computer readable media are configured to perform operations comprising receiving metadata associated with a snapshot of data; extracting one or more textual features from the metadata; and determining a classification of the snapshot based on the one or more textual features.

20 Claims, 13 Drawing Sheets

100

200

Numerical Features

Textual Features

Feature Generation
202

Snapshot Metadata

Prompt <u>400</u>

We have a snapshot of user backup data and need help classifying the snapshot.

Here are the top file extensions:
extension: ".pdf", percent created: 24, percent modified: 10; percent deleted: 38
extension: ".exe", , percent created: 12, percent modified: 32; percent deleted: 10

⋮

402

Looking at the type and size of the extensions, classify the snapshot using one of the following tags: System Upgrade, Suspicious Extensions, Application Upgrade, Temp File Cleanup, Normal Churn, User Data Churn, or None.

Provide a response in JSON format and reason, returning the tag with the highest probability.

FIGURE 4A

Prompt <u>410</u>

We are providing top directory names for each position in a file path.

Here are the top directory names:
position: 0, {Y: [99.98, 99.32, 98.37], Z: [0.02, 0.65, 1.63], C: [0.0, 0.02, 0.01]}
position: 1, {Temp: [90.8, 98.3, 98.4], Windows: [9.0, 0.8, 0.8]}

⋮

412

How does this affect your decision in classifying the snapshot?

Provide a response in a similar JSON format, returning the tag and reason.

FIGURE 4B

Figure 4C:
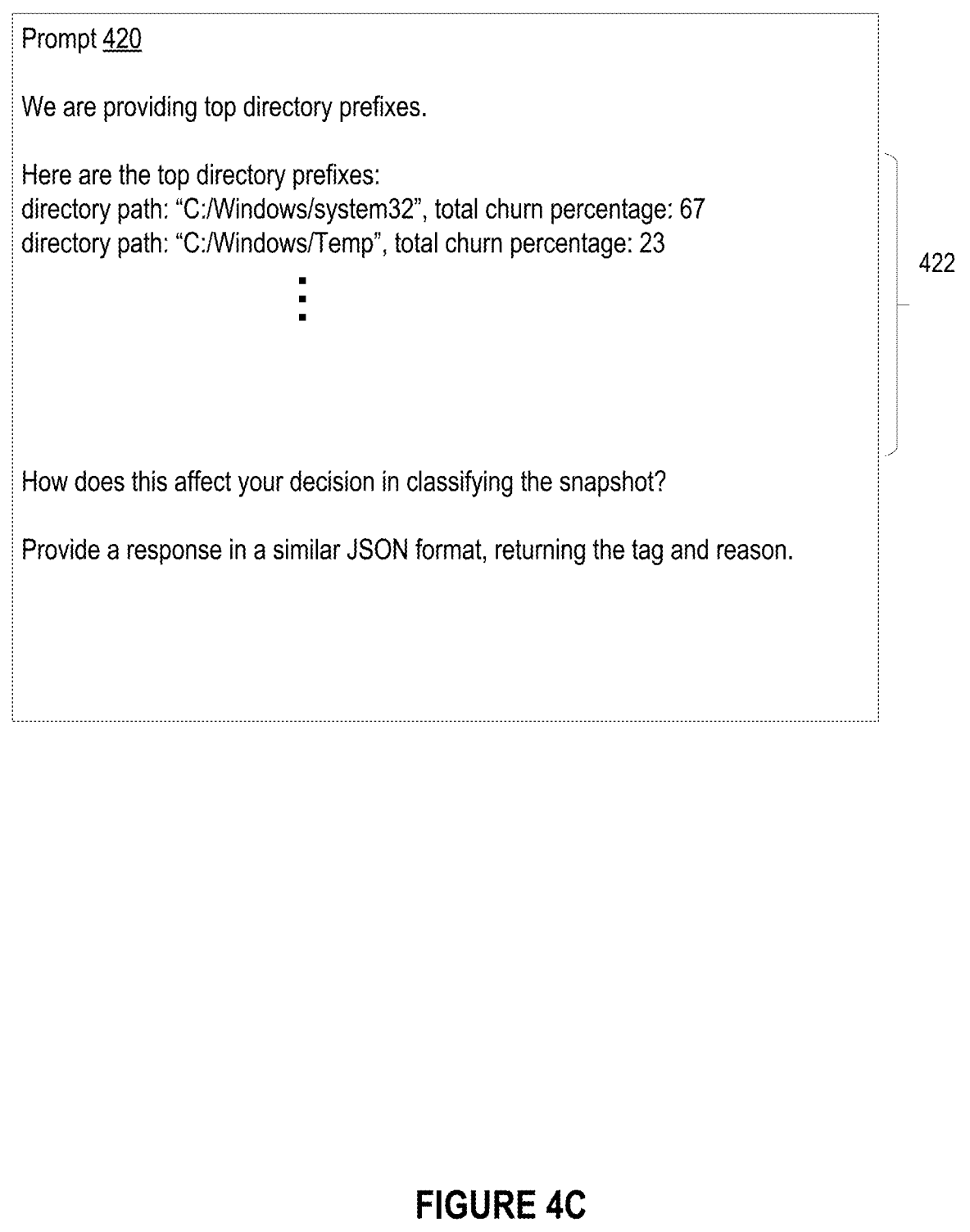

Prompt 420

We are providing top directory prefixes.

Here are the top directory prefixes:
directory path: "C:/Windows/system32", total churn percentage: 67
directory path: "C:/Windows/Temp", total churn percentage: 23

⋮

How does this affect your decision in classifying the snapshot?

Provide a response in a similar JSON format, returning the tag and reason.

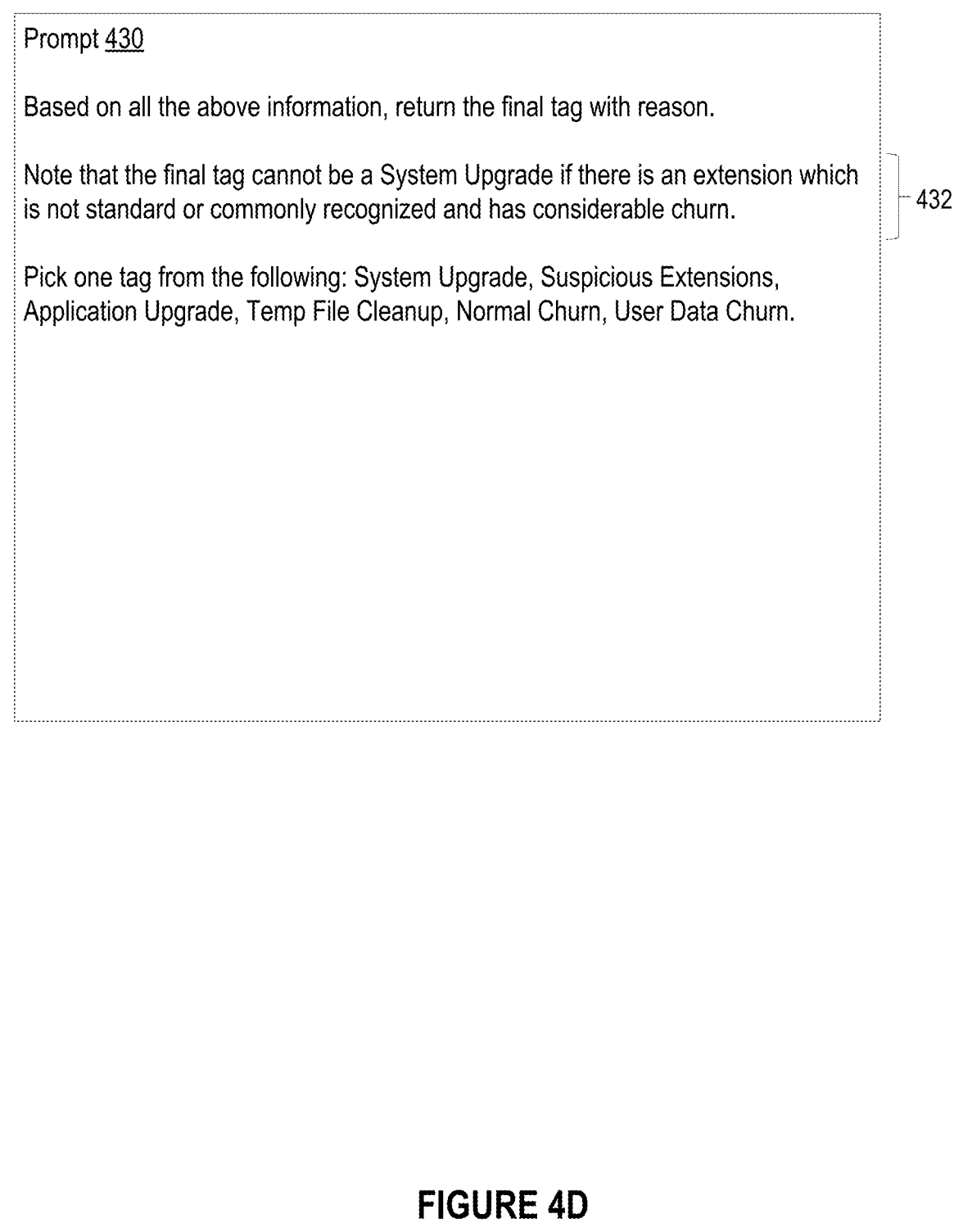

Prompt 430

Based on all the above information, return the final tag with reason.

Note that the final tag cannot be a System Upgrade if there is an extension which
is not standard or commonly recognized and has considerable churn.                    432

Pick one tag from the following: System Upgrade, Suspicious Extensions,
Application Upgrade, Temp File Cleanup, Normal Churn, User Data Churn.

FIGURE 4D

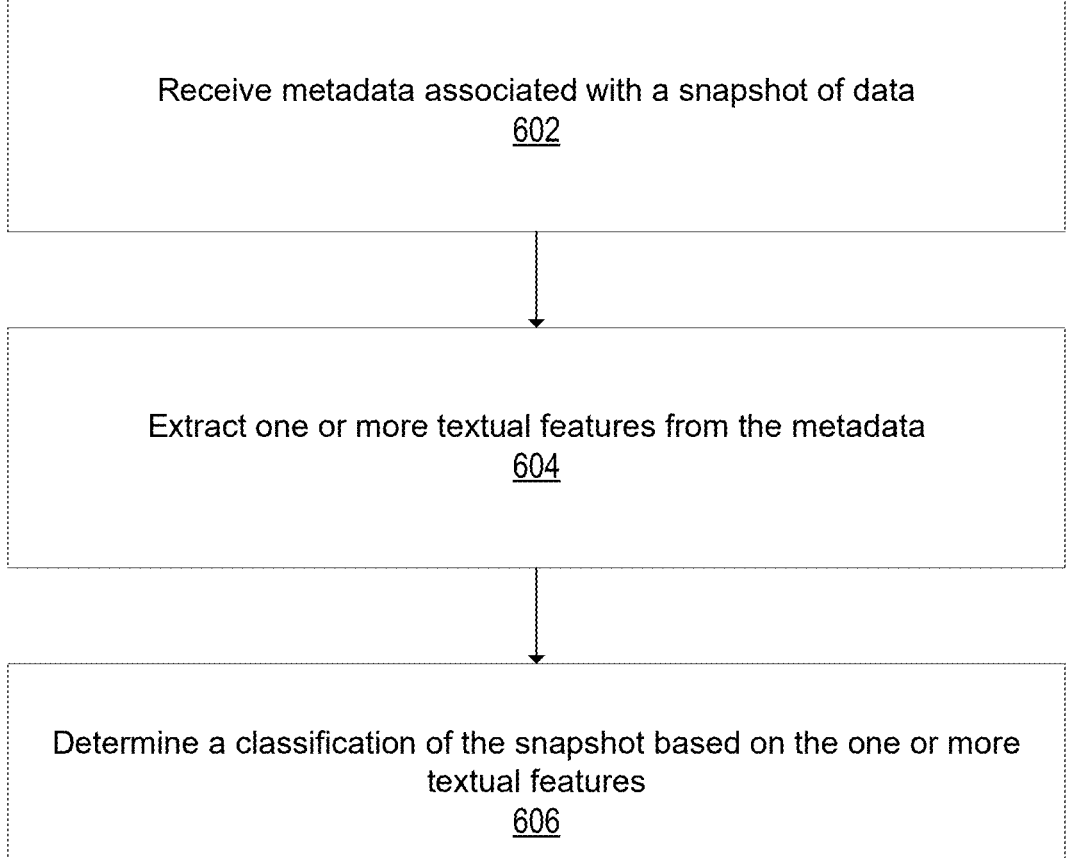
Receive metadata associated with a snapshot of data
602
Extract one or more textual features from the metadata
604
Determine a classification of the snapshot based on the one or more textual features
606
FIGURE 6

700

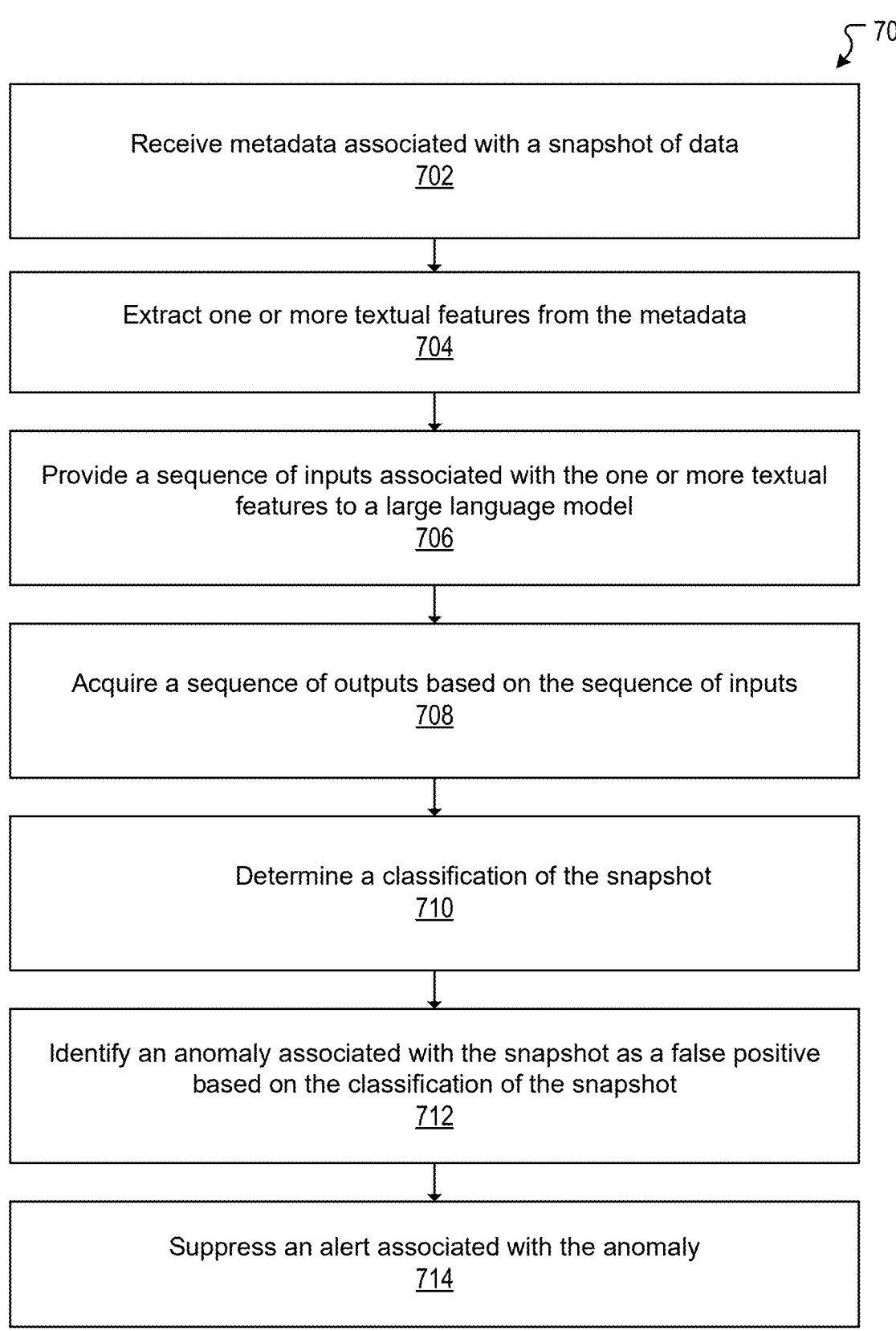

Receive metadata associated with a snapshot of data
702

Extract one or more textual features from the metadata
704

Provide a sequence of inputs associated with the one or more textual features to a large language model
706

Acquire a sequence of outputs based on the sequence of inputs
708

Determine a classification of the snapshot
710

Identify an anomaly associated with the snapshot as a false positive based on the classification of the snapshot
712

Suppress an alert associated with the anomaly
714

Processor  1002

Instructions  1024

Main Memory  1004

Instructions  1024

Non-Volatile Memory  1006

Network Interface Device  1020

Network
1040

Bus
1008

Video Display  1010

Alpha-Numeric Input Device  1012

Cursor Control Device  1014

Machine-readable Medium  1022

Instructions
1024

Database
1030

Signal Generation Device  1018

LARGE LANGUAGE MODEL BASED SYSTEM UPGRADE CLASSIFIER

FIELD OF THE INVENTION

The present technology relates to the field of generative artificial intelligence. More particularly, the present technology relates to techniques to perform anomaly detection based on large language models.

BACKGROUND

A data management service (DMS) can provide data backup, data recovery, data protection, and various other forms of data management services. One fundamental challenge associated with data management services is reliable and accurate detection of anomalies. A correct determination about the occurrence of an anomaly can precipitate a variety of targeted investigative or remedial actions. In some instances, however, the determination about the occurrence of an anomaly can be incorrect—i.e., in reality, no anomaly occurred.

SUMMARY

Various embodiments of the present technology can include systems, methods, and non-transitory computer readable media configured to perform operations comprising: receiving metadata associated with a snapshot of data; extracting one or more textual features from the metadata; and determining a classification of the snapshot based on the one or more textual features.

In some embodiments, the operations further comprise: identifying an anomaly associated with the snapshot as a false positive based on the classification of the snapshot; and suppressing an alert associated with the anomaly.

In some embodiments, determining the classification of the snapshot comprises: providing a sequence of inputs associated with the one or more textual features to a machine learning model based on a priority associated with the one or more textual features, the one or more textual features associated with at least one of file extensions, file path terms, and directory prefixes; and acquiring a sequence of outputs based on the sequence of inputs, wherein each output in the sequence of outputs is associated with a corresponding input in the sequence of inputs.

In some embodiments, the machine learning model includes a large language model (LLM), the sequence of inputs includes a sequence of prompts provided to the LLM, and the sequence of outputs includes a sequence of responses generated by the LLM.

In some embodiments, a first input of the sequence of inputs relates to the file extensions; a second input of the sequence of inputs relates to the file path terms; a third input of the sequence of inputs relates to the directory prefixes; and a fourth input of the sequence of inputs relates to the first input, a first output associated with the first input, the second input, a second output associated with the second input, the third input, and a third output associated with the third input; and wherein the classification is determined based on a fourth output associated with the fourth input.

In some embodiments, the operations further comprise: determining file extensions of created files, deleted files, and modified files based on the metadata; determining a selected number of top occurring file extensions from the file extensions; and determining a percentage created, a percentage modified, and a percentage deleted for each file extension of the top occurring file extensions, wherein the classification of the snapshot is based on types and sizes associated with the top occurring file extensions.

In some embodiments, the operations further comprise: determining file paths of created files, deleted files, and modified files based on the metadata; determining a selected number of top occurring file path terms for each file path position associated with the file paths; and determining a percentage created, a percentage modified, and a percentage deleted for each file path term of the top occurring file path terms for each position in the file paths, wherein the classification of the snapshot is based on the top occurring file path terms for each file path position.

In some embodiments, the operations further comprise: determining file paths of created files, deleted files, and modified files based on the metadata; determining a selected number of top occurring file directory prefixes of the file paths; and determining a percentage contribution to total churn for each file directory prefix of the top occurring file directory prefixes, wherein the classification of the snapshot is based on the top occurring file directory prefixes.

In some embodiments, the classification is one from a plurality of classifications including a first classification relating to a system upgrade, a second classification relating to an application upgrade, a third classification relating to temporary file churn, a fourth classification relating to user data churn, and a fifth classification relating to suspicious file extensions churn, and wherein the fourth classification relating to user data churn and the fifth classification relating to suspicious file extensions churn are associated with an anomaly.

In some embodiments, the operations further comprise: extracting one or more numerical features from the metadata; detecting an anomaly associated with the snapshot based on the one or more numerical features; identifying the anomaly as a true positive based on the classification of the snapshot; and determining a category for the anomaly based on the one or more numerical features and the one or more textual features.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

BRIEF DESCRIPTION OF THE DRAWINGS

FIGS. 4A-4D illustrate a prompt chain based on file path features, according to an embodiment of the present technology.

FIG. 6 illustrates a method, according to an embodiment of the present technology.

FIG. 7 illustrates a method, according to an embodiment of the present technology.

Figure 1:
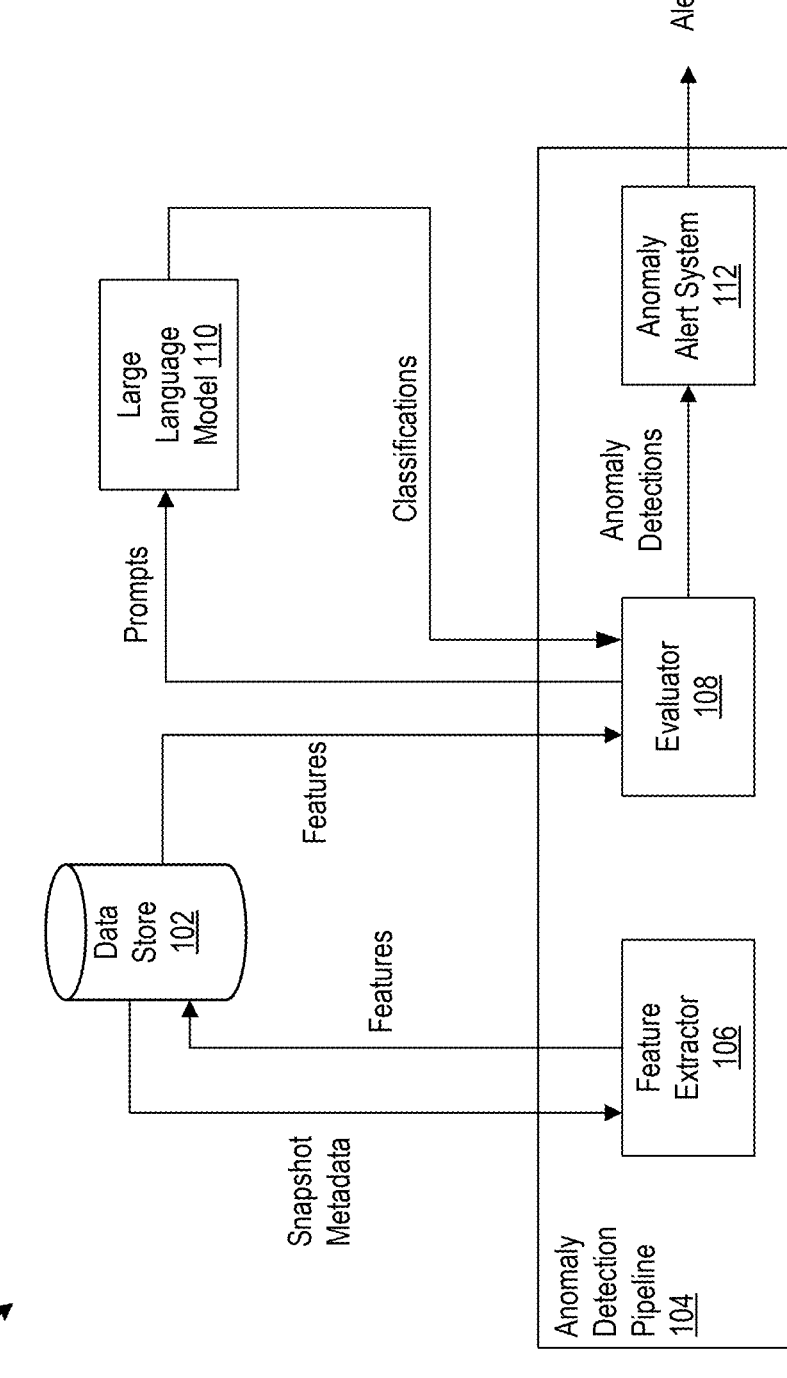
FIG. 1 illustrates a system to enhance anomaly detection, according to an embodiment of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

A data management service can provide data backup, data recovery, data protection, and other types of services. One fundamental challenge associated with data management services is reliable and accurate detection of anomalous activities in relation to managed data. An inability to reliably detect an anomaly can result in loss of data and a variety of undesirable potential consequences.

Consistent and accurate detection of anomalous activities is vital to securing and protecting data. However, the detection of anomalous activities is a technological challenge in data management environments. As just one example, a computing system as part of routine maintenance may undergo a planned system upgrade. Such an activity of course should not constitute an anomaly. A system upgrade can involve a relatively large magnitude of changes to associated files (or churn), such as modifying files, deleting files, and creating files, as compared to normal usage. While the planned system upgrade is not anomalous, the relatively large magnitude of changes to files can potentially produce a misleading signal that incorrectly indicates the occurrence of an anomaly. Thus, conventional approaches that perform anomaly detection based on the magnitude of changes to files or other quantitative measures relating to churn are often prone to error. An incorrect determination about the occurrence of the anomaly can needlessly and undesirably generate alarm and incur substantial related cost.

An improved approach rooted in computer technology overcomes the foregoing and other disadvantages associated with conventional approaches specifically arising in the realm of computer technology. FIG. 1 illustrates an example system 100 to enhance anomaly detection, according to an embodiment of the present technology. In the system 100, an initial determination of the occurrence of an anomaly (i.e., a positive determination) in a first stage can be followed by a subsequent determination regarding whether the initial determination is correct (i.e., a true positive determination) or incorrect (i.e., false positive determination) in a second stage. In response to determination of a false positive, an alert that otherwise would be triggered is suppressed. In some embodiments, the system 100 can be implemented by or in a data management service. For example, the data management service can provide a data backup service, a data recovery service, a data protection service, a data classification service, a data transfer or replication service, or other data services. To perform such services, the data management service can generate and maintain snapshots of data of its users. An example of a data management service and related environment in accordance with the present technology is discussed in relation to a data management service 910 in FIG. 9, as described in more detail below.

In FIG. 1, the system 100 can include a data store 102, an anomaly detection pipeline 104, and a large language model (LLM) 110. The anomaly detection pipeline 104 can include a feature extractor 106, an evaluator 108, and an anomaly alert system 112. The components and features (e.g., modules, elements, stores, functionalities, operations, etc.) shown in this figure and all figures herein are exemplary only, and other implementations may include additional, fewer, integrated, or different components. Some components or features may not be shown so as not to obscure relevant details. In various embodiments, one or more of the components and features described in connection with the system 100 can be implemented in any suitable combinations.

The data store 102 can store backup data as snapshots. A snapshot can be one or more files that represent a state of a workload or computing object (e.g., a virtual machine, a file system, a database, a virtual disk, a virtual desktop, etc.) at a particular point in time. Snapshots can be generated periodically or on a scheduled basis. A snapshot of a workload can be associated with metadata. The metadata can include a differential file system metadata (Diff FMD) file that is uploaded to the data store 102 when the snapshot is captured. The Diff FMD file can enumerate all files of the snapshot that have changed since the last time a snapshot of the workload was captured. Changes to files, such as creation, modification, and deletion of files, can be representative of churn reflected in a snapshot. The Diff FMD file can include aggregate numerical data as well as textual information, as discussed in more detail herein. A Diff FMD file maintained in the data store 102 can be provided to the feature extractor 106 of the anomaly detection pipeline 104. The feature extractor 106 can extract relevant features from the Diff FMD file, including numerical features and textual features, as discussed in more detail herein. The extracted features can be provided to the data store 102 for storage.

The extracted features can be provided from the data store 102 to the evaluator 108. The evaluator 108 can detect whether an anomaly has occurred with respect to a snapshot relating to a workload based at least in part on features extracted from metadata associated with the snapshot. The evaluator 108 can generate determinations about the potential occurrence of an anomaly in various stages. For example, in a first stage, the evaluator 108 can generate an initial determination regarding whether an anomaly has occurred with respect to a snapshot. The initial determination can be generated through one or more techniques. For example, in one technique, the initial determination can be generated based on numerical features extracted from a Diff FMD file associated with the snapshot. In another technique, the evaluator 108 can analyze metadata relating to the identity of one or more persons who performed actions on or otherwise interacted with the workload to determine the potential occurrence of an anomaly relating to the snapshot. Many techniques are possible. In some instances, an initial determination regarding whether an anomaly has occurred can be based on one technique or a combination of techniques. When the evaluator 108 determines in the first stage that an anomaly has occurred, the determination can constitute a positive determination of an anomaly. When the evaluator 108 determines in the first stage that an anomaly does not exist, the determination can constitute a negative determination of an anomaly.

For example, in a second stage, the evaluator 108 can perform a further validation or check on the positive determination of an anomaly relating to the snapshot resulting from the first stage. The check can be performed through analysis of metadata associated with the snapshot. The evaluator 108 can determine in the second stage whether an anomaly relating to the snapshot has occurred based on the textual features extracted from a Diff FMD file associated with the snapshot. The textual features extracted from the Diff FMD file can be transformed into a set of prompts. The set of prompts can be provided to the LLM 110. In some instances, the LLM can be a pretrained LLM on which no fine tuning has been performed. In response to the set of prompts, the LLM 110 can output one or more classifications of the snapshot. In some instances, the LLM 110 can be instructed to select a classification of the snapshot from a predetermined set of classifications. For example, the predetermined set of classifications can be or include system upgrade, application upgrade, temporary file churn, normal churn, user data churn, suspicious file extensions churn, or no classification. In some instances, a different predetermined set of classifications can be used.

Based on the classification, evaluator 108 can determine if the positive determination is a true positive or a false positive. If a true positive is determined, detection of an anomaly associated with the snapshot is validated or confirmed. In response to determination of the true positive, the anomaly alert system 112 can be triggered to perform various actions in response to the anomaly. For example, the actions can include storing data about the anomaly and associated snapshot. As another example, the actions can include provision of alerts to an entity or user to which the snapshot belongs or to an entity in control of the anomaly detection pipeline 104. The alerts can include, for example, a description of the anomaly and potential remedial action to perform. If a false positive is determined, the positive determination of an anomaly associated with the snapshot is rejected. In response to determination of the false positive, the anomaly alert system 112 is not triggered and an alert can be suppressed, prevented, or avoided. In view of the determination of the false positive, further analysis of the snapshot in relation to anomaly detection can be suspended or concluded. In some instances, the evaluator 108 can be a machine learning model or classifier implemented to perform the referenced functionality. For example, the evaluator 108 can be a suitably trained neural network or a large language model. More details regarding detection of anomalies are provided herein.

The system 100 can include many variations. In some instances, one entity (e.g., organization) can control, operate, maintain, or provide the anomaly detection pipeline 104, while one or more other entities (e.g., third parties) can control, operate, maintain, or provide the data store 102 and the LLM 110. For example, the entity that controls, operates, maintains, or provides the anomaly detection pipeline 104 can utilize the data store 102 and the LLM 110 as external services or cloud services remotely hosted by other entities. In some instances, an entity can control, operate, maintain, or provide the anomaly detection pipeline 104, as well as one or both of the data store 102 and the LLM 110. Many variations are possible.

In some embodiments, the system 100 can be implemented by one or more server systems or in the cloud. In some embodiments, the functionality of the system 100 can be performed by an application associated with the system 100 and run on a client computing device. In some embodiments, the functionality of the system 100 can be distributed between a server system (or the cloud) and an application run on a client computing device.

Although the present technology is sometimes herein described in relation to a data management service, the present technology in some embodiments can be implemented in a variety of different environments and contexts apart from a data management service. For example, the present technology can apply to any environment or implementation involving the detection and handling of anomalous activities.

Figure 2:
FIG. 2 illustrates feature extraction from metadata, according to an embodiment of the present technology.

FIG. 2 illustrates an example block diagram 200 of feature extraction from metadata, according to an embodiment of the present technology. In some embodiments, the functionality of the block diagram 200 can be performed by the feature extractor 106. Snapshot metadata can be obtained from the data store 102. The snapshot metadata can include Diff FMD files associated with snapshots. The snapshot metadata can be provided to feature generation 202. Based on feature generation 202, numerical features from a Diff FMD file associated with a snapshot can be extracted. The numerical features in the Diff FMD file can relate to various quantitative descriptions about a workload associated with the snapshot, such as the number of files that have changed since the last time a snapshot of the workload was captured. For example, the numerical features can identify the changed files and provide a count of the files. The numerical features also can include whether the changed files have been created, modified, or deleted, as well as the size (or magnitude) of the operations. For example, the size of a create, modify, or delete operation can be expressed in bytes. Other numerical features can be extracted from metadata associated with a snapshot.

Based on feature generation 202, textual features from metadata, including Diff FMD files associated with snapshots, can be extracted. The textual features in a Diff FMD file associated with a snapshot can include selected file path features. The file path features can indicate relevant file types and locations relating to file system activity that can inform the classification of a snapshot.

In some instances, the file path features can include top occurring file extensions. The top occurring file extensions can be a selected number of file extensions that most frequently occur in a Diff FMD file. The file path feature of the top occurring file extensions can be an important signal that indicates the type of files that have been created, modified, or deleted. The type of files that have been created, modified, or deleted in non-anomalous activities (e.g., upgrade scenarios) typically can include, for example, binaries, .exe, .dll, and the like. In contrast, the types of files that have been created, modified, or deleted in anomalous activities (e.g., cyberattacks) typically can include, for example, .pdf, .doc, other user file extensions, and the like.

In some instances, the file path features can include top occurring terms in file paths at each position. The top occurring terms in file paths at each position can be, for each position in a file path, a selected number of terms that most frequently occur in the position. The file path feature of the top occurring terms in file paths at each position can be an important signal that indicates locations where files have been created, modified, or deleted. Non-anomalous activities (e.g., upgrades) typically occur in certain locations (e.g., C:/Windows/or C:/Program Files/), whereas anomalous activities typically occur in other locations, such as user directories (e.g., D:/<user name>/ or D:/<organization name>/). As just one example, in relation to non-anomalous activities such as upgrade scenarios, the term "C:" frequently occurs at position 0 in the file path while the terms "Windows" or "Program Files" frequently occur at position 1.

In some instances, the file path features can include top occurring directory prefixes for each file operation (e.g., create, modify, delete). The top occurring directory prefixes for each file operation can be a selected number of full directory prefixes that most frequently occur in a Diff FMD file. Similar to the file path feature of the top occurring terms in file paths at each position, the file path feature of the top occurring directory prefixes for each file operation can be an important signal that indicates locations where files have been created, modified, or deleted through consideration of full directory prefixes instead of individual positions thereof. In some instances, a selected limit on maximum file path depth can be applied in the consideration of one-grams in relation to the top occurring terms in file paths and directory prefixes in relation to the top occurring directory prefixes to limit or otherwise control computer processing time in the determination of the file path features.

The file path features can vary. In some instances, a file path feature can reflect one type of operation (e.g., created, modified, or deleted). In some instances, a file path feature can reflect two or more types of operations (e.g., created and modified; created and deleted; modified and deleted; created, modified, and deleted). In some instances, one, a portion, or any combination of the file path features of the top occurring file extensions, the top occurring terms in file paths, and the top occurring directory prefixes can be extracted. In some instances, additional file path features, apart from the top occurring file extensions, the top occurring terms in file paths, and the top occurring directory prefixes, can be extracted from metadata to inform a classification of a snapshot. Many variations are possible. Some examples of file path features are illustrated in FIGS. 4A-4C, as discussed below.

The file path features can be utilized to inform the classification of a snapshot. As mentioned, in some instances, a classification can be a system upgrade, application upgrade, temporary file churn, normal churn, user data churn, suspicious file extensions churn, or no classification. Other classifications are possible. In some instances, a classification can be determined from a predetermined set of classifications including some or all of the aforementioned classifications. In some instances, the predetermined set of classifications can include other classifications. As discussed in more detail herein, classification of a snapshot, in turn, can inform a determination about the occurrence of anomalous activities or non-anomalous activities in relation to the snapshot.

Figure 3:
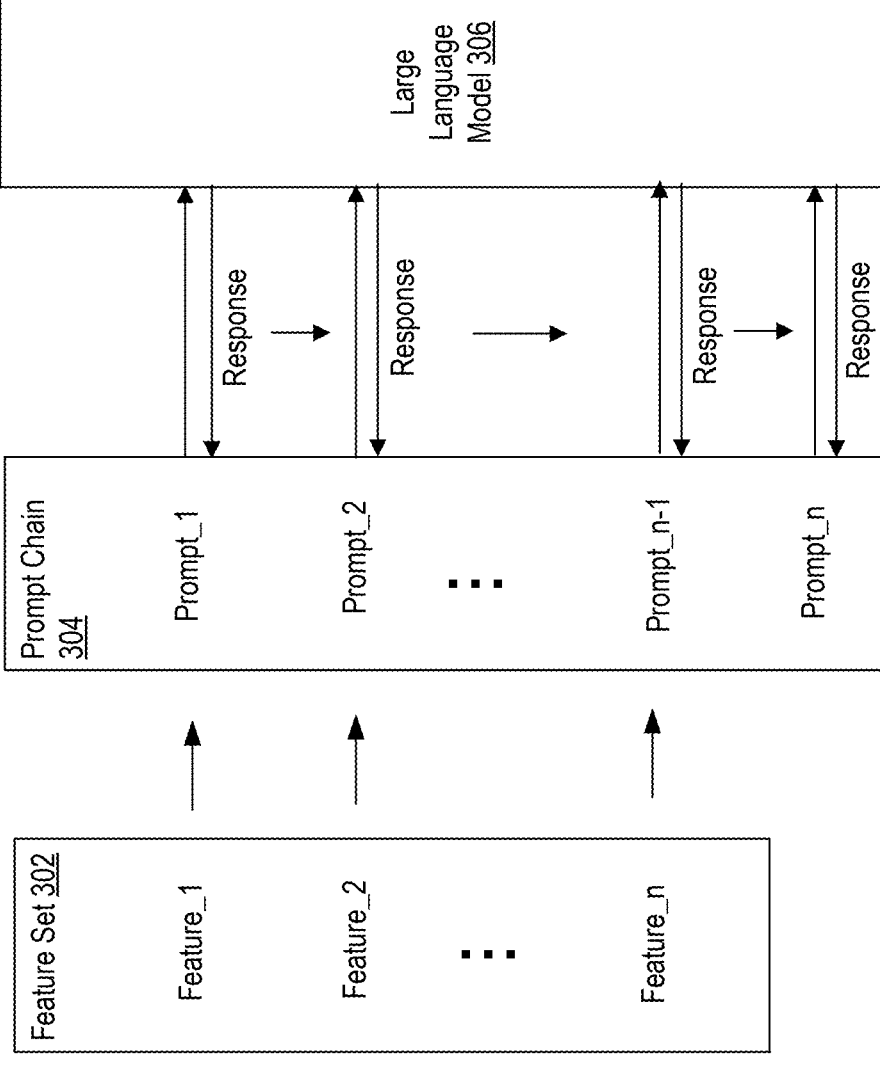
FIG. 3 illustrates a prompting technique based on file path features, according to an embodiment of the present technology.

FIG. 3 illustrates an example block diagram 300 of a prompting technique based on file path features, according to an embodiment of the present technology. In some embodiments, the functionality of the block diagram 300 can be performed by the evaluator 108 in the second stage. A feature set 302 can be determined. The feature set 302 can include any suitable number of features. The feature set 302 can be the textual features generated by the feature extractor 106, such as file path features. The features of the feature set 302 can be selectively arranged, organized, combined, segmented, or otherwise transformed in a variety of manners into a set of prompts for provision to a large language model (LLM) 306 to obtain responses that classify an associated snapshot. In some embodiments, the LLM 306 can be the LLM 110.

A prompt can have a structure with one or more components. Components in a structured prompt can vary. In some instances, a structured prompt can have one or more of the following components: a component to specify a specific task or instruction to be performed by an LLM; a component to specify context, such as additional information that can enable the LLM to generate a better response; a component to specify an input or question for which the LLM is to generate a response; a component to specify the format or type of a response; a component to specify a role for the LLM that indicates a desired perspective or expertise; a component to specify an example to illustrate a desired prompt-output pair; a component to specify a desired tone or style for the output; etc. Other types of components can be utilized in a prompt. The prompts created based on the features of the feature set 302 can include any selection or combination of suitable components.

The prompts can be provided to the LLM 306 in a variety of prompting techniques. In one technique, the features of the feature set 302 can be ordered in a sequence. For example, the sequence of the features can be based on the importance or priority of each feature in determination of a classification of an associated snapshot. The sequence can reflect an order of decreasing feature importance such that the most important feature appears first in the sequence. Each feature in the feature set 302 can be associated with a corresponding prompt in a prompt chain (or chain of prompts) 304. Each prompt in the prompt chain 304 can be provided in sequence to the LLM 306 to elicit a corresponding response. For example, a first prompt can be provided to the LLM 306 and a first response can be generated by the LLM 306; then, a second prompt can be provided to the LLM 306 and a second response can be generated by the LLM 306; and so on. The prompt chain 304 can include one or more prompts not associated with a corresponding feature of the feature set 302. For example, a prompt not associated with a corresponding feature of the feature set 302 can be a last prompt (e.g., "Prompt_n") that concludes the prompt chain 304. The sequence of prompts reflected in the prompt chain 304 can preserve session context and continuity, thereby enhancing the ability of the LLM 306 to provide accurate responses for the prompt chain 304. Other techniques to transform the feature set 302 into one or more prompts for provision to an LLM to generate classifications of snapshots are discussion herein.

FIGS. 4A-4D illustrate an example prompt chain based on file path features, according to an embodiment of the present technology. In some embodiments, the prompt chain can be generated by the evaluator 108 in the second stage and modeled based on the prompt chain 304. As illustrated, prompts in the prompt chain can reflect a structure including components that specify, for example, a task of classifying a snapshot, an instruction to select a classification for the snapshot from a predetermined set of classifications, and an input for which an LLM is to generate a classification. The prompt chain can include prompts generated based on selected file path features. The file path features can be associated with textual information from metadata associated with a snapshot, such as a Diff FMD file. As referenced, the file path features can include top occurring file extensions, top occurring terms in file paths, and top occurring directory prefixes. A first prompt 400, a second prompt 410, a third prompt 420, and a fourth prompt 430 can be provided in a sequence to the LLM to preserve context and continuity. As referenced, the order of the prompts in the sequence can indicate their relative importance in classification of the snapshot.

FIG. 4A illustrates the first prompt 400 in the prompt chain relating to the file path feature of top occurring file extensions. Among other components in the structure of the prompt 400, field 402 can include relevant information regarding the top occurring file extensions from which the LLM can generate a classification of the snapshot as a response. As illustrated, the file extensions that most frequently occur in the snapshot are listed and, for each file extension, values indicating percentages of creations, modifications, and deletions in relation to the files of the snapshot that have been created, modified, and deleted, are listed respectively. The prompt 400 can include a constraint that the classification of the snapshot should be limited to a predetermined set of classifications (e.g., system upgrade, application upgrade, temporary file churn, normal churn, user data churn, suspicious file extensions churn, or no classification). In addition, the prompt 400 can include a constraint that the response provided by the LLM should reflect a certain format (e.g., JSON format). The constraints can be included to reduce randomness in the responses provided by the LLM and to specify the attributes of a desired response.

FIG. 4B illustrates the second prompt 410 in the prompt chain relating to the file path feature of top occurring terms in file paths. Among other components in the structure of the prompt 410, field 412 can include relevant information regarding the top occurring terms (e.g., directory names or one-grams) at each position in file paths from which the LLM can generate a classification of the snapshot as a response. As illustrated, the directory names that most frequently occur at each position in the snapshot are listed and, for each directory name, values indicating percentages of creations, modifications, and deletions in relation to the files of the snapshot that have been created, modified, and deleted, are listed respectively.

FIG. 4C illustrates the third prompt 420 in the prompt chain relating to the file path feature of top occurring directory prefixes. Among other components in the structure of the prompt 420, field 422 can include relevant information regarding the top occurring directory prefixes from which the LLM can generate a classification of the snapshot as a response. As illustrated, the full directory prefixes that most frequently occur for each file operation (e.g., create, modify, delete) can be listed and, for each full directory prefix, a value indicating a percentage of churn in relation to all churn of the snapshot is listed.

FIG. 4D illustrates the fourth prompt 430 in the prompt chain. The fourth prompt 430 is a final prompt in the prompt chain to elicit a final classification of the snapshot from the LLM. Among other components in the structure of the prompt 430, field 432 can include a constraint on a response provided by the LLM. For example, as illustrated, the constraint provides that a final classification provided by the LLM should not be system upgrade if there is a file extension that is not standard or commonly recognized and that has considerable churn. The response provided by the LLM based on the fourth prompt 430 can be parsed to extract the final classification (or label).

The prompts 400, 410, 420, 430 are merely examples. In other examples, the sequence, number, components, and content of the prompts 400, 410, 420, 430 can vary. As just one example, a prompt can include more than one file path feature and the number of prompts in the prompt chain can change. In some instances, file path features can be provided to the LLM through other prompting techniques, as discussed in more detail herein. Many variations are possible.

Figure 5:
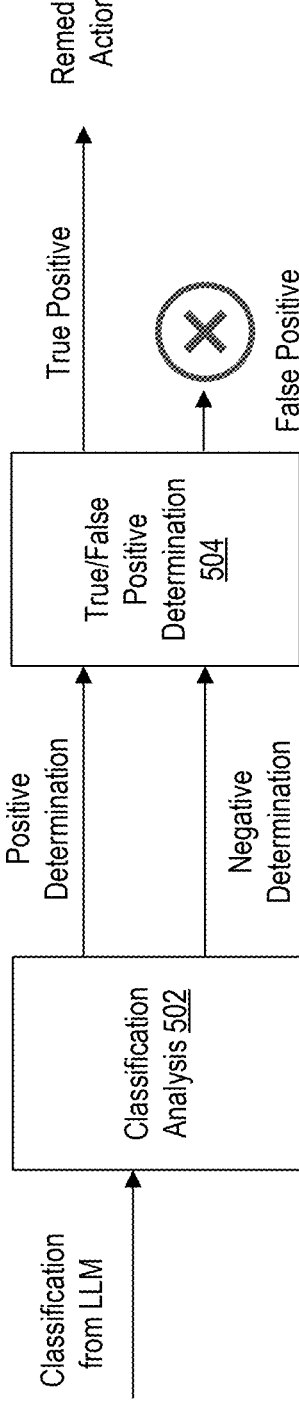
FIG. 5 illustrates a false positive determination, according to an embodiment of the present technology.

FIG. 5 illustrates an example block diagram 500 of a false positive determination, according to an embodiment of the present technology. In some embodiments, the functionality of the block diagram 500 can be performed by the evaluator 108 in the second stage. A classification (or final classification) of a snapshot generated by the LLM 110 can be provided to classification analysis 502. The classification can be analyzed to determine whether the classification indicates the occurrence of an anomaly. As referenced, the classifications provided by the LLM 110 can be from a predetermined set of classifications. For each classification of the predetermined set, the classification analysis 502 can indicate whether the classification indicates the occurrence of an anomaly or not. For example, in a predetermined set of classifications that includes system upgrade, application upgrade, temporary file churn, normal churn, user data churn, suspicious file extensions churn, or no classification, the classification analysis 502 can specify that the classifications of user data churn and suspicious file extensions churn indicate anomalous activities while the other classifications do not indicate the occurrence of anomalous activities. When a classification indicates the occurrence of anomalous activities, a positive determination can be generated by the classification analysis 502. At true/false positive determination 504, a true positive can be determined based on the positive determination. The determination of the true positive can trigger a variety of remedial actions. The remedial actions can be performed by the anomaly alert system 112, as discussed. When a classification does not indicate the occurrence of anomalous activities, a negative determination can be generated by the classification analysis 502. At the true/false positive determination 504, a false positive can be determined based on the negative determination. The determination of the false positive can suppress an alert or otherwise prevent an alert from being generated, as discussed.

The determination of a true positive or a false positive associated with a snapshot can generate a categorization or label for the associated snapshot. A snapshot that was determined in the first stage to be associated with anomalous activity can be categorized or labeled with an appropriate classification (or tag) from a predetermined set of classifications (e.g., system upgrade, application upgrade, temporary file churn, normal churn, user data churn, suspicious file extensions churn, or no classification) as determined in the second stage by the LLM 110. Accordingly, the categorization or labeling of snapshots in this manner can be based on numerical information analyzed in the first stage and textual information (e.g., file path features) analyzed in the second stage.

FIG. 6 illustrates an example method 600, according to an embodiment of the present technology. It should be understood that there can be additional, fewer, or alternative steps performed in similar or alternative orders, or in parallel, based on the various features and embodiments discussed herein unless otherwise stated. At block 602, the method 600 can receive metadata associated with a snapshot of data. At block 604, the method 600 can extract one or more textual features from the metadata. At block 606, the method 600 can determine a classification of the snapshot based on the one or more textual features.

FIG. 7 illustrates an example method 700, according to an embodiment of the present technology. It should be understood that there can be additional, fewer, or alternative steps performed in similar or alternative orders, or in parallel, based on the various features and embodiments discussed herein unless otherwise stated. At block 702, the method 700 can receive metadata associated with a snapshot of data. At block 704, the method 700 can extract one or more textual features from the metadata. At block 706, the method 700 can provide a sequence of inputs associated with the one or more textual features to a large language model. At block 708, the method 700 can acquire a sequence of outputs based on the sequence of inputs. At block 710, the method 700 can determine a classification of the snapshot. At block 712, the method 700 can identify an anomaly associated with the snapshot as a false positive based on the classification of the snapshot. At block 714, the method 700 can suppress an alert associated with the anomaly.

Figure 8:
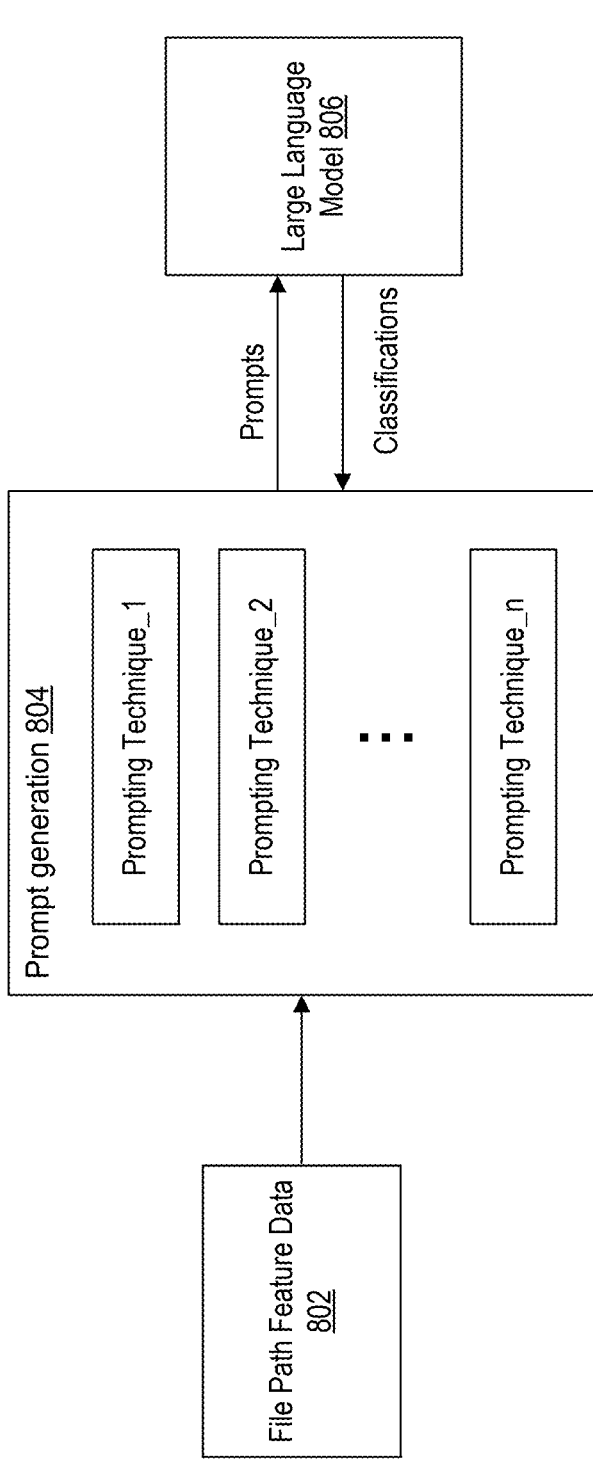
FIG. 8 illustrates prompt generation based on file path features, according to an embodiment of the present technology.

FIG. 8 illustrates an example block diagram 800 of prompt generation based on file path features, according to an embodiment of the present technology. In some embodiments, the functionality of the block diagram 800 can be performed by the evaluator 108 in the second stage. File path feature data 802 that informs the classification of associated snapshots can be selected. As referenced, the file path feature data 802 can include textual information extracted from metadata associated with snapshots. For example, the metadata can include Diff FMD files. In some instances, the file path feature data 802 can be any suitable selection or combination of features extracted from Diff FMD files, such as churn-related data associated with file extensions, file path terms, and directory prefixes, as discussed. The file path feature data 802 can be provided to a prompt generator 804. The prompt generator 804 can utilize a variety of suitable prompting techniques to generate different types of prompts based on the file path feature data 802. In some instances, the prompts can include examples. An example can be a selection of file path features associated with a snapshot along with a corresponding classification of the snapshot. The prompts can be provided to a large language model (LLM) 806. In some embodiments, the LLM 806 can be the LLM 110. Based on the prompts, the LLM 806 can output classifications of snapshots that can be utilized to determine whether anomalous activities have occurred in relation to the snapshots, as described. In addition to the prompting techniques discussed in relation to FIGS. 3 and 4A-4D, the prompting techniques that can be utilized by the prompt generator 804 include few-shot prompting, chain-of-thought (CoT) prompting, generated-knowledge prompting, self-consistency, least-to-most prompting (LtM), self-refining prompting, among others. Any suitable prompting technique can be utilized in accordance with the present technology.

Figure 9:
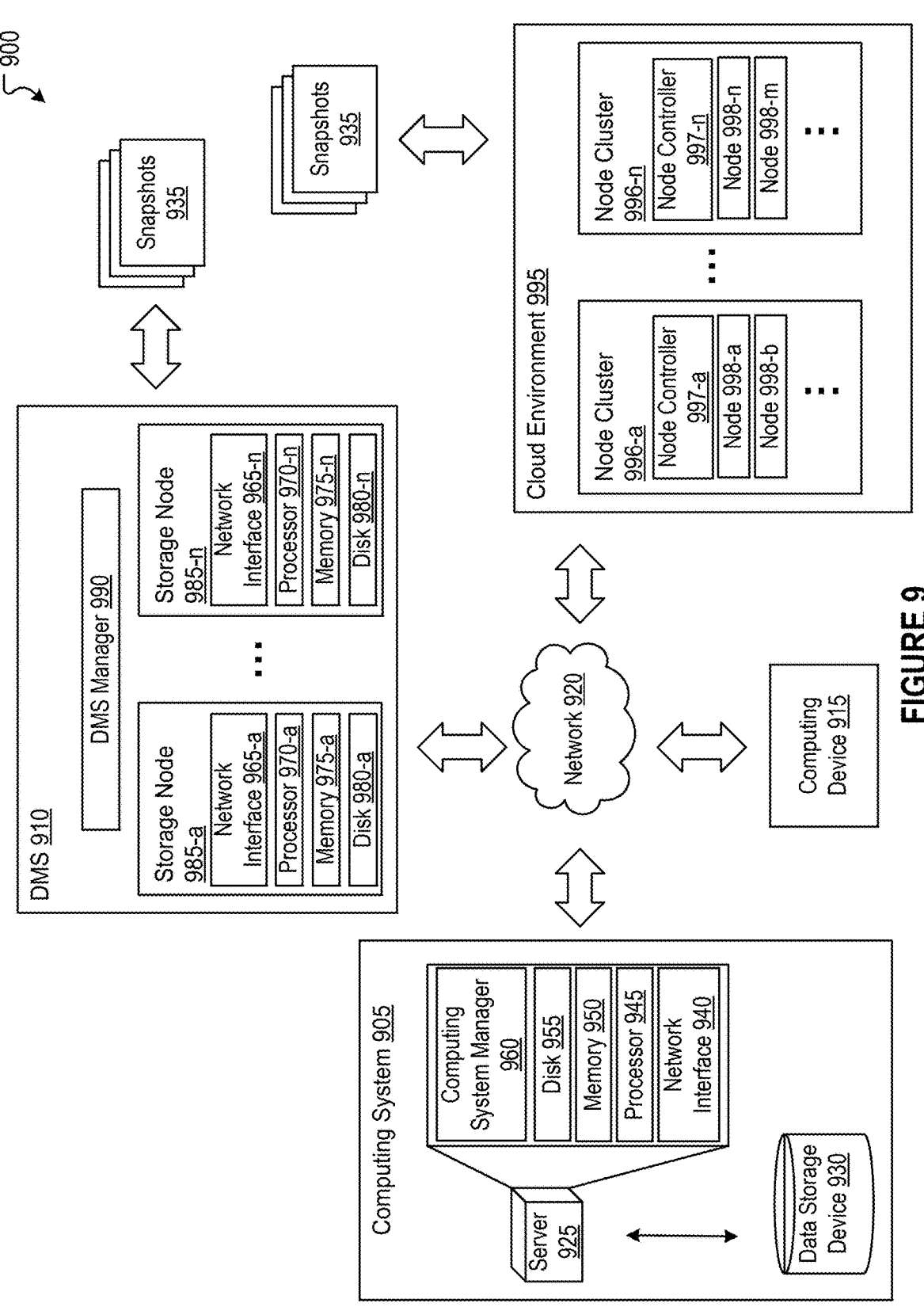
FIG. 9 illustrates a computing environment in which the system to enhance anomaly detection can be implemented, according to an embodiment of the present technology.

FIG. 9 illustrates an example of a computing environment 900 in which the system 100 to enhance anomaly detection can be implemented, according to an embodiment of the present technology. The computing environment 900 may include a computing system 905, a data management service (DMS) 910, and one or more computing devices 915, which may be in communication with one another via a network 920. The computing system 905 may generate, store, process, modify, or otherwise use associated data, and the DMS 910 may provide one or more data management services for the computing system 905. For example, the DMS 910 may provide a data backup service, a data recovery service, a data classification service, a data transfer or replication service, a data protection service, and other data management services.

The network 920 may allow the one or more computing devices 915, the computing system 905, and the DMS 910 to communicate (e.g., exchange information) with one another. The network 920 may include aspects of one or more wired networks (e.g., the Internet), one or more wireless networks (e.g., cellular networks), or any combination thereof. The network 920 may include aspects of one or more public networks or private networks, as well as secured or unsecured networks, or any combination thereof. The network 920 also may include any quantity of communications links and any quantity of hubs, bridges, routers, switches, ports or other physical or logical network components.

A computing device 915 may be used to input information to or receive information from the computing system 905, the DMS 910, or both. For example, a user of the computing device 915 may provide user inputs via the computing device 915, which may result in commands, data, or any combination thereof being communicated via the network 920 to the computing system 905, the DMS 910, or both. Additionally, or alternatively, a computing device 915 may output (e.g., display) data or other information received from the computing system 905, the DMS 910, or both. A user of a computing device 915 may, for example, use the computing device 915 to interact with one or more UIs (e.g., graphical user interfaces (GUIs)) to operate or otherwise interact with the computing system 905, the DMS 910, or both. Though one computing device 915 is shown in FIG. 8, it is to be understood that the computing environment 900 may include any quantity of computing devices 915.

A computing device 915 may be a stationary device (e.g., a desktop computer or access point) or a mobile device (e.g., a laptop computer, tablet computer, or cellular phone). In some examples, a computing device 915 may be a commercial computing device, such as a server or collection of servers. And in some examples, a computing device 915 may be a virtual device (e.g., a virtual machine). Though shown as a separate device in the example computing environment of FIG. 8, it is to be understood that in some cases a computing device 915 may be included in (e.g., may be a component of) the computing system 905 or the DMS 910.

The computing system 905 may include one or more servers 925 and may provide (e.g., to the one or more computing devices 915) local or remote access to applications, databases, or files stored within the computing system 905. The computing system 905 may further include one or more data storage devices 930. Though one server 925 and one data storage device 930 are shown in FIG. 8, it is to be understood that the computing system 905 may include any quantity of servers 925 and any quantity of data storage devices 930, which may be in communication with one another and collectively perform one or more functions ascribed herein to the server 925 and data storage device 930.

A data storage device 930 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 930 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 930 may be a database (e.g., a relational database), and a server 925 may host (e.g., provide a database management system for) the database.

A server 925 may allow a client (e.g., a computing device 915) to download information or files (e.g., executable, text, application, audio, image, or video files) from the computing system 905, to upload such information or files to the computing system 905, or to perform a search related to particular information stored by the computing system 905. In some examples, a server 925 may act as an application server or a file server. In general, a server 925 may refer to one or more hardware devices that act as the host in a client-server relationship or a software process that shares a resource with or performs work for one or more clients.

A server 925 may include a network interface 940, processor 945, memory 950, disk 955, and computing system manager 960. The network interface 940 may enable the server 925 to connect to and exchange information via the network 920 (e.g., using one or more network protocols). The network interface 940 may include one or more wireless network interfaces, one or more wired network interfaces, or any combination thereof. The processor 945 may execute computer-readable instructions stored in the memory 950 in order to cause the server 925 to perform functions ascribed herein to the server 925. The processor 945 may include one or more processing units, such as one or more central processing units (CPUs), one or more graphics processing units (GPUs), or any combination thereof. The memory 950 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 955 may include one or more HDDs, one or more SSDs, or any combination thereof. Memory 950 and disk 955 may comprise hardware storage devices. The computing system manager 960 may manage the computing system 905 or aspects thereof (e.g., based on instructions stored in the memory 950 and executed by the processor 945) to perform functions ascribed herein to the computing system 905. In some examples, the network interface 940, processor 945, memory 950, and disk 955 may be included in a hardware layer of a server 925, and the computing system manager 960 may be included in a software layer of the server 925. In some cases, the computing system manager 960 may be distributed across (e.g., implemented by) multiple servers 925 within the computing system 905.

In some examples, the computing system 905 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 905 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 915 over the network 920). IaaS may refer to a service in which physical computing resources are used to instantiate one or more virtual machines, the resources of which are made available to one or more client devices over a network (e.g., to one or more computing devices 915 over the network 920).

In some examples, the computing system 905 or aspects thereof may implement or be implemented by one or more virtual machines. The one or more virtual machines may run various applications, such as a database server, an application server, or a web server. For example, a server 925 may be used to host (e.g., create, manage) one or more virtual machines, and the computing system manager 960 may manage a virtualized infrastructure within the computing system 905 and perform management operations associated with the virtualized infrastructure. The computing system manager 960 may manage the provisioning of virtual machines running within the virtualized infrastructure and provide an interface to a computing device 915 interacting with the virtualized infrastructure. For example, the computing system manager 960 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 955, the memory, the processor 945, the network interface 940, the data storage device 930, or any combination thereof in support of running the various applications. Storage resources (e.g., the disk 955, the memory 950, or the data storage device 930) that are virtualized may be accessed by applications as a virtual disk.

The DMS 910 may provide one or more data management services for data associated with the computing system 905 and may include DMS manager 990 and any quantity of storage nodes 985. The DMS manager 990 may manage operation of the DMS 910, including the storage nodes 985. Though illustrated as a separate entity within the DMS 910, the DMS manager 990 may in some cases be implemented (e.g., as a software application) by one or more of the storage nodes 985. In some examples, the storage nodes 985 may be included in a hardware layer of the DMS 910, and the DMS manager 990 may be included in a software layer of the DMS 910. In the example illustrated in FIG. 8, the DMS 910 is separate from the computing system 905 but in communication with the computing system 905 via the network 920. It is to be understood, however, that in some examples at least some aspects of the DMS 910 may be located within computing system 905. For example, one or more servers 925, one or more data storage devices 930, and at least some aspects of the DMS 910 may be implemented within the same cloud environment or within the same data center.

Storage nodes 985 of the DMS 910 may include respective network interfaces 965, processors 970, memories 975, and disks 980. The network interfaces 965 may enable the storage nodes 985 to connect to one another, to the network 920, or both. A network interface 965 may include one or more wireless network interfaces, one or more wired network interfaces, or any combination thereof. The processor 970 of a storage node 985 may execute computer-readable instructions stored in the memory 975 of the storage node 985 in order to cause the storage node 985 to perform processes described herein as performed by the storage node 985. A processor 970 may include one or more processing units, such as one or more CPUs, one or more GPUs, or any combination thereof. The memory 975 may comprise one or more types of memory (e.g., RAM, SRAM, DRAM, ROM, EEPROM, Flash, etc.). A disk 980 may include one or more HDDs, one or more SDDs, or any combination thereof. Memories 975 and disks 980 may comprise hardware storage devices. Collectively, the storage nodes 985 may in some cases be referred to as a storage cluster or as a cluster of storage nodes 985.

The DMS 910 may provide a backup and recovery service for the computing system 905. For example, the DMS 910 may manage the extraction and storage of snapshots 935 associated with different point-in-time versions of one or more target computing objects within the computing system 905. A snapshot 935 of a computing object (e.g., a virtual machine, a database, a file system, a virtual disk, a virtual desktop, or other type of computing system or storage system) may be a file (or set of files) that represents a state of the computing object (e.g., the data thereof) as of a particular point in time. A snapshot 935 may also be used to restore (e.g., recover) the corresponding computing object as of the particular point in time corresponding to the snapshot 935. A computing object of which a snapshot 935 may be generated may be referred to as snappable. Snapshots 935 may be generated at different times (e.g., periodically or on some other scheduled or configured basis) in order to represent the state of the computing system 905 or aspects thereof as of those different times. In some examples, a snapshot 935 may include metadata that defines a state of the computing object as of a particular point in time. For example, a snapshot 935 may include metadata associated with (e.g., that defines a state of) some or all data blocks included in (e.g., stored by or otherwise included in) the computing object. Snapshots 935 (e.g., collectively) may capture changes in the data blocks over time. Snapshots 935 generated for the target computing objects within the computing system 905 may be stored in one or more storage locations (e.g., the disk 955, memory 950, the data storage device 930) of the computing system 905, in the alternative or in addition to being stored within the DMS 910, as described below.

To obtain a snapshot 935 of a target computing object associated with the computing system 905 (e.g., of the entirety of the computing system 905 or some portion thereof, such as one or more databases, virtual machines, or file systems within the computing system 905), the DMS manager 990 may transmit a snapshot request to the computing system manager 960. In response to the snapshot request, the computing system manager 960 may set the target computing object into a frozen state (e.g., a read-only state). Setting the target computing object into a frozen state may allow a point-in-time snapshot 935 of the target computing object to be stored or transferred.

In some examples, the computing system 905 may generate the snapshot 935 based on the frozen state of the computing object. For example, the computing system 905 may execute an agent of the DMS 910 (e.g., the agent may be software installed at and executed by one or more servers 925), and the agent may cause the computing system 905 to generate the snapshot 935 and transfer the snapshot 935 to the DMS 910 in response to the request from the DMS 910. In some examples, the computing system manager 960 may cause the computing system 905 to transfer, to the DMS 910, data that represents the frozen state of the target computing object, and the DMS 910 may generate a snapshot 935 of the target computing object based on the corresponding data received from the computing system 905.

Once the DMS 910 receives, generates, or otherwise obtains a snapshot 935, the DMS 910 may store the snapshot 935 at one or more of the storage nodes 985. The DMS 910 may store a snapshot 935 at multiple storage nodes 985, for example, for improved reliability. Additionally, or alternatively, snapshots 935 may be stored in some other location connected with the network 920. For example, the DMS 910 may store more recent snapshots 935 at the storage nodes 985, and the DMS 910 may transfer less recent snapshots 935 via the network 920 to a cloud environment (which may include or be separate from the computing system 905) for storage at the cloud environment, a magnetic tape storage device, or another storage system separate from the DMS 910.

Updates made to a target computing object that has been set into a frozen state may be written by the computing system 905 to a separate file (e.g., an update file) or other entity within the computing system 905 while the target computing object is in the frozen state. After the snapshot 935 (or associated data) of the target computing object has been transferred to the DMS 910, the computing system manager 960 may release the target computing object from the frozen state, and any corresponding updates written to the separate file or other entity may be merged into the target computing object.

In response to a restore command (e.g., from a computing device 915 or the computing system 905), the DMS 910 may restore a target version (e.g., corresponding to a particular point in time) of a computing object based on a corresponding snapshot 935 of the computing object. In some examples, the corresponding snapshot 935 may be used to restore the target version based on data of the computing object as stored at the computing system 905 (e.g., based on information included in the corresponding snapshot 935 and other information stored at the computing system 905, the computing object may be restored to its state as of the particular point in time). Additionally, or alternatively, the corresponding snapshot 935 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 935. For example, the target version of the computing object may be restored based on the information in a snapshot 935 and based on information included in a backup copy of the target object generated prior to the time corresponding to the target version. Backup copies of the computing object may be stored at the DMS 910 (e.g., in the storage nodes 985) or in some other location connected with the network 920 (e.g., in a cloud environment, which in some cases may be separate from the computing system 905).

In some examples, the DMS 910 may restore the target version of the computing object and transfer the data of the restored computing object to the computing system 905. And in some examples, the DMS 910 may transfer one or more snapshots 935 to the computing system 905, and restoration of the target version of the computing object may occur at the computing system 905 (e.g., as managed by an agent of the DMS 910, where the agent may be installed and operate at the computing system 905).

In response to a mount command (e.g., from a computing device 915 or the computing system 905), the DMS 910 may instantiate data associated with a point-in-time version of a computing object based on a snapshot 935 corresponding to the computing object (e.g., along with data included in a backup copy of the computing object) and the point-in-time. The DMS 910 may then allow the computing system 905 to read or modify the instantiated data (e.g., without transferring the instantiated data to the computing system). In some examples, the DMS 910 may instantiate (e.g., virtually mount) some or all of the data associated with the point-in-time version of the computing object for access by the computing system 905, the DMS 910, or the computing device 915.

In some examples, the DMS 910 may store different types of snapshots 935, including for the same computing object. For example, the DMS 910 may store both base snapshots 935 and incremental snapshots 935. A base snapshot 935 may represent the entirety of the state of the corresponding computing object as of a point in time corresponding to the base snapshot 935. An incremental snapshot 935 may represent the changes to the state—which may be referred to as the delta—of the corresponding computing object that have occurred between an earlier or later point in time corresponding to another snapshot 935 (e.g., another base snapshot 935 or incremental snapshot 935) of the computing object and the incremental snapshot 935. In some cases, some incremental snapshots 935 may be forward-incremental snapshots 935 and other incremental snapshots 935 may be reverse-incremental snapshots 935. To generate a full snapshot 935 of a computing object using a forward-incremental snapshot 935, the information of the forward-incremental snapshot 935 may be combined with (e.g., applied to) the information of an earlier base snapshot 935 of the computing object along with the information of any intervening forward-incremental snapshots 935, where the earlier base snapshot 935 may include a base snapshot 935 and one or more reverse-incremental or forward-incremental snapshots 935. To generate a full snapshot 935 of a computing object using a reverse-incremental snapshot 935, the information of the reverse-incremental snapshot 935 may be combined with (e.g., applied to) the information of a later base snapshot 935 of the computing object along with the information of any intervening reverse-incremental snapshots 935.

In some examples, the DMS 910 may provide a data classification service, a malware detection service, a data transfer or replication service, backup verification service, or any combination thereof, among other possible data management services for data associated with the computing system 905. For example, the DMS 910 may analyze data included in one or more computing objects of the computing system 905, metadata for one or more computing objects of the computing system 905, or any combination thereof, and based on such analysis, the DMS 910 may identify locations within the computing system 905 that include data of one or more target data types (e.g., sensitive data, such as data subject to privacy regulations or otherwise of particular interest) and output related information (e.g., for display to a user via a computing device 915). Additionally, or alternatively, the DMS 910 may detect whether aspects of the computing system 905 have been impacted by malware (e.g., ransomware). Additionally, or alternatively, the DMS 910 may relocate data or create copies of data based on using one or more snapshots 935 to restore the associated computing object within its original location or at a new location (e.g., a new location within a different computing system 905). Additionally, or alternatively, the DMS 910 may analyze backup data to ensure that the underlying data (e.g., user data or metadata) has not been corrupted. The DMS 910 may perform such data classification, malware detection, data transfer or replication, or backup verification, for example, based on data included in snapshots 935 or backup copies of the computing system 905, rather than live contents of the computing system 905, which may beneficially avoid adversely affecting (e.g., infecting, loading, etc.) the computing system 905.

In some examples, the DMS 910, and in particular the DMS manager 990, may be referred to as a control plane. The control plane may manage tasks, such as storing data management data or performing restorations, among other possible examples. The control plane may be common to multiple customers or tenants of the DMS 910. For example, the computing system 905 may be associated with a first customer or tenant of the DMS 910, and the DMS 910 may similarly provide data management services for one or more other computing systems associated with one or more additional customers or tenants. In some examples, the control plane may be configured to manage the transfer of data management data (e.g., snapshots 935 associated with the computing system 905) to a cloud environment 995 (e.g., Microsoft Azure or Amazon Web Services). In addition, or as an alternative, to being configured to manage the transfer of data management data to the cloud environment 995, the control plane may be configured to transfer metadata for the data management data to the cloud environment 995. The metadata may be configured to facilitate storage of the stored data management data, the management of the stored management data, the processing of the stored management data, the restoration of the stored data management data, and the like.

Each customer or tenant of the DMS 910 may have a private data plane, where a data plane may include a location at which customer or tenant data is stored. For example, each private data plane for each customer or tenant may include a node cluster 996 across which data (e.g., data management data, metadata for data management data, etc.) for a customer or tenant is stored. Each node cluster 996 may include a node controller 997 which manages the nodes 998 of the node cluster 996. As an example, a node cluster 996 for one tenant or customer may be hosted on Microsoft Azure, and another node cluster 996 may be hosted on Amazon Web Services. In another example, multiple separate node clusters 996 for multiple different customers or tenants may be hosted on Microsoft Azure. Separating each customer or tenant's data into separate node clusters 996 provides fault isolation for the different customers or tenants and provides security by limiting access to data for each customer or tenant.

The control plane (e.g., the DMS 910, and specifically the DMS manager 990) manages tasks, such as storing backups or snapshots 935 or performing restorations, across the multiple node clusters 996. For example, as described herein, a node cluster 996-*a* may be associated with the first customer or tenant associated with the computing system 905. The DMS 910 may obtain (e.g., generate or receive) and transfer the snapshots 935 associated with the computing system 905 to the node cluster 996 a in accordance with a service level agreement for the first customer or tenant associated with the computing system 905. For example, a service level agreement may define backup and recovery parameters for a customer or tenant such as snapshot generation frequency, which computing objects to backup, where to store the snapshots 935 (e.g., which private data plane), and how long to retain snapshots 935. As described herein, the control plane may provide data management services for another computing system associated with another customer or tenant. For example, the control plane may generate and transfer snapshots 935 for another computing system associated with another customer or tenant to the node cluster 996 *n* in accordance with the service level agreement for the other customer or tenant.

To manage tasks, such as storing backups or snapshots 935 or performing restorations, across the multiple node clusters 996, the control plane (e.g., the DMS manager 990) may communicate with the node controllers 997 for the various node clusters via the network 920. For example, the control plane may exchange communications for backup and recovery tasks with the node controllers 997 in the form of transmission control protocol (TCP) packets via the network 920.

Figure 10:
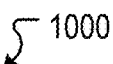
FIG. 10 illustrates an example computer system, according to an embodiment of the present technology.

FIG. 10 illustrates an example of a computer system 1000 that may be used to implement one or more of the embodiments of the present technology. For example, the computer system 1000 can be implemented as a server, server system, or other type of computing system of the system 100, the anomaly detection pipeline 104, the data management service (DMS) 910, the computing system 905, the cloud environment 995, or the computing device 915. The computer system 1000 can be included in a wide variety of local and remote machine and computer system architectures and in a wide variety of network and cloud computing environments that can implement the functionalities of the present technology. The computer system 1000 includes sets of instructions 1024 for causing the computer system 1000 to perform the functionality, features, and operations discussed herein. The computer system 1000 may be connected (e.g., networked) to other machines and/or computer systems. In a networked deployment, the computer system 1000 may operate in the capacity of a server or a client machine in a client-server network environment, or as a peer machine in a peer-to-peer (or distributed) network environment.

The computer system 1000 includes a processor 1002 (e.g., a central processing unit (CPU), a graphics processing unit (GPU), or both), a main memory 1004, and a nonvolatile memory 1006 (e.g., volatile RAM and non-volatile RAM, respectively), which communicate with each other via a bus 1008. In some embodiments, the computer system 1000 can be a desktop computer, a laptop computer, personal digital assistant (PDA), or mobile phone, for example. In one embodiment, the computer system 1000 also includes a video display 1010, an alphanumeric input device 1012 (e.g., a keyboard), a cursor control device 1014 (e.g., a mouse), a signal generation device 1018 (e.g., a speaker) and a network interface device 1020.

In one embodiment, the video display 1010 includes a touch sensitive screen for user input. In one embodiment, the touch sensitive screen is used instead of a keyboard and mouse. A machine-readable medium 1022 can store one or more sets of instructions 1024 (e.g., software) embodying any one or more of the methodologies, functions, or operations described herein. The instructions 1024 can also reside, completely or at least partially, within the main memory 1004 and/or within the processor 1002 during execution thereof by the computer system 1000. The instructions 1024 can further be transmitted or received over a network 1040 via the network interface device 1020. In some embodiments, the machine-readable medium 1022 also includes a database 1030.

The processor 1002 can be, for example, a hardware based integrated circuit (IC) or any other suitable processing device configured to run or execute a set of instructions or a set of codes. For example, the processor 1002 can include a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like.

The network 1040, which can represent the network 1020, can be, for example, a digital telecommunication network of servers and/or computing devices. The servers and/or computing device on the network can be connected via one or more wired or wireless communication networks (not shown) to share resources such as, for example, data storage and/or computing power. The wired or wireless communication networks between servers and/or computing devices of the network can include one or more communication channels, for example, a radio frequency (RF) communication channel(s), an extremely low frequency (ELF) communication channel(s), an ultra-low frequency (ULF) communication channel(s), a low frequency (LF) communication channel(s), a medium frequency (MF) communication channel(s), an ultra-high frequency (UHF) communication channel(s), an extremely high frequency (EHF) communication channel(s), a fiber optic communication channel(s), an electronic communication channel(s), a satellite communication channel(s), and/or the like. The network can be, for example, the Internet, an intranet, a local area network (LAN), a wide area network (WAN), a metropolitan area network (MAN), a worldwide interoperability for microwave access network (WiMAX®), any other suitable communication system, and/or a combination of such networks.

The network 1040 can use standard communications technologies and protocols. Thus, the network can include links using technologies such as Ethernet, 902.11, worldwide interoperability for microwave access (WiMAX®), 3G, 4G, 5G, CDMA, GSM, LTE, digital subscriber line (DSL), etc. Similarly, the networking protocols used on the network can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 1006 may also be a random access memory. The non-volatile memory 1006 can be a local device coupled directly to the rest of the components in the computer system 1000. A non-volatile memory that is remote from the system, such as a network storage device coupled to any of the computer systems described herein through a network interface such as a modem or Ethernet interface, can also be used.

While the machine-readable medium 1022 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 1000 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in the same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine or computer-readable media used to actually affect the distribution.

Some embodiments described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java™, JavaScript, C++, and/or other programming languages and software development tools. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java™, C++, etc.) or other suitable programming languages and/or development tools. Additional examples of computer code include, but are not limited to, control signals, encrypted code, and compressed code.

For purposes of explanation, numerous specific details are set forth in order to provide a thorough understanding of the description. It will be apparent, however, to one skilled in the art that embodiments of the present technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in some embodiments," "in various embodiments," "in an example," "in one implementation," "in one instance," "in some instances," or the like means that a particular feature, design, structure, or characteristic described in connection with the embodiment is included in at least one embodiment of the present technology. The appearances of, for example, the phrases "according to an embodiment," "in one embodiment," "in an embodiment," "in some embodiments," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the present technology of the embodiments of the invention is intended to be illustrative, but not limiting, of the scope of the invention, which is set forth in the following claims.

What is claimed is:

1. A computer-implemented method comprising:
receiving, by a computing system, metadata associated with a snapshot of data;
generating, by the computing system, an initial determination regarding occurrence of an anomaly associated with the snapshot, where the generating the initial determination comprises:
extracting, by the computing system, numerical features from the metadata, and
generating, by the computing system, a positive determination of the anomaly based on the numerical features;
extracting, by the computing system, one or more textual features from the metadata;
determining, by the computing system, a classification of the snapshot based on the one or more textual features, wherein determining the classification of the snapshot comprises:
providing, by the computing system, a sequence of inputs associated with the one or more textual features to a machine learning model based on a priority associated with the one or more textual features, the one or more textual features associated with at least one of file extensions, file path terms, and directory prefixes, and
acquiring, by the computing system, a sequence of outputs based on the sequence of inputs, wherein each output in the sequence of outputs is associated with a corresponding input in the sequence of inputs;
identifying, by the computing system, the anomaly associated with the snapshot as a false positive based on the classification of the snapshot; and
suppressing, by the computing system, an alert associated with the anomaly.

2. The computer-implemented method of claim 1, wherein the machine learning model includes a large language model (LLM), the sequence of inputs includes a sequence of prompts provided to the LLM, and the sequence of outputs includes a sequence of responses generated by the LLM.

3. The computer-implemented method of claim 1, wherein a first input of the sequence of inputs relates to the file extensions; a second input of the sequence of inputs relates to the file path terms; a third input of the sequence of inputs relates to the directory prefixes; and a fourth input of the sequence of inputs relates to the first input, a first output associated with the first input, the second input, a second output associated with the second input, the third input, and a third output associated with the third input; and wherein the classification is determined based on a fourth output associated with the fourth input.

4. The computer-implemented method of claim 1, further comprising:
determining, by the computing system, file extensions of created files, deleted files, and modified files based on the metadata;
determining, by the computing system, a selected number of top occurring file extensions from the file extensions; and
determining, by the computing system, a percentage created, a percentage modified, and a percentage deleted for each file extension of the top occurring file extensions, wherein the classification of the snapshot is based on types and sizes associated with the top occurring file extensions.

5. The computer-implemented method of claim 1, further comprising:
determining, by the computing system, file paths of created files, deleted files, and modified files based on the metadata;
determining, by the computing system, a selected number of top occurring file path terms for each file path position associated with the file paths; and
determining, by the computing system, a percentage created, a percentage modified, and a percentage deleted for each file path term of the top occurring file path terms for each position in the file paths, wherein the classification of the snapshot is based on the top occurring file path terms for each file path position.

6. The computer-implemented method of claim 1, further comprising:
determining, by the computing system, file paths of created files, deleted files, and modified files based on the metadata;
determining, by the computing system, a selected number of top occurring file directory prefixes of the file paths; and
determining, by the computing system, a percentage contribution to total churn for each file directory prefix of the top occurring file directory prefixes, wherein the classification of the snapshot is based on the top occurring file directory prefixes.

7. The computer-implemented method of claim 1, wherein the classification is one from a plurality of classifications including a first classification relating to a system upgrade, a second classification relating to an application upgrade, a third classification relating to temporary file churn, a fourth classification relating to user data churn, and a fifth classification relating to suspicious file extensions churn, and wherein the fourth classification relating to user data churn and the fifth classification relating to suspicious file extensions churn are associated with an anomaly.

8. The computer-implemented method of claim 1, further comprising:
extracting, by the computing system, one or more numerical features from the metadata;

detecting, by the computing system, a second anomaly associated with the snapshot based on the one or more numerical features;

identifying, by the computing system, the second anomaly as a true positive based on the classification of the snapshot; and determining, by the computing system, a category for the second anomaly based on the one or more numerical features and textual features extracted from the metadata.

9. The computer-implemented method of claim 1, wherein the metadata includes a differential file system metadata (Diff FMD) file.

10. The computer-implemented method of claim 9, wherein the Diff FMD file is uploaded to a datastore when the snapshot is captured.

11. A system comprising:

at least one processor; and a memory storing instructions that, when executed by the at least one processor, cause the system to perform operations comprising:

receiving metadata associated with a snapshot of data;

generating an initial determination regarding occurrence of an anomaly associated with the snapshot, where the generating the initial determination comprises:

extracting numerical features from the metadata, and generating a positive determination of the anomaly based on the numerical features;

extracting one or more textual features from the metadata; and determining a classification of the snapshot based on the one or more textual features, wherein determining the classification of the snapshot comprises:

providing a sequence of inputs associated with the one or more textual features to a machine learning model based on a priority associated with the one or more textual features, the one or more textual features associated with at least one of file extensions, file path terms, and directory prefixes, and acquiring a sequence of outputs based on the sequence of inputs, wherein each output in the sequence of outputs is associated with a corresponding input in the sequence of inputs;

identifying the anomaly associated with the snapshot as a false positive based on the classification of the snapshot; and suppressing an alert associated with the anomaly.

12. The system of claim 11, wherein the machine learning model includes a large language model (LLM), the sequence of inputs includes a sequence of prompts provided to the LLM, and the sequence of outputs includes a sequence of responses generated by the LLM.

13. The system of claim 11, wherein a first input of the sequence of inputs relates to the file extensions; a second input of the sequence of inputs relates to the file path terms; a third input of the sequence of inputs relates to the directory prefixes; and a fourth input of the sequence of inputs relates to the first input, a first output associated with the first input, the second input, a second output associated with the second input, the third input, and a third output associated with the third input; and wherein the classification is determined based on a fourth output associated with the fourth input.

14. The system of claim 11, wherein the metadata includes a differential file system metadata (Diff FMD) file.

15. The system of claim 14, wherein the Diff FMD file is uploaded to a datastore when the snapshot is captured.

16. A non-transitory computer-readable storage medium including instructions that, when executed by at least on processor of a computing system, cause the computing system to perform operations comprising:

receiving metadata associated with a snapshot of data;

generating an initial determination regarding occurrence of an anomaly associated with the snapshot, where the generating the initial determination comprises:

extracting numerical features from the metadata, and generating a positive determination of the anomaly based on the numerical features;

extracting one or more textual features from the metadata; and determining a classification of the snapshot based on the one or more textual features, wherein determining the classification of the snapshot comprises:

providing a sequence of inputs associated with the one or more textual features to a machine learning model based on a priority associated with the one or more textual features, the one or more textual features associated with at least one of file extensions, file path terms, and directory prefixes, and acquiring a sequence of outputs based on the sequence of inputs, wherein each output in the sequence of outputs is associated with a corresponding input in the sequence of inputs;

identifying the anomaly associated with the snapshot as a false positive based on the classification of the snapshot; and suppressing an alert associated with the anomaly.

17. The non-transitory computer-readable storage medium of claim 16, wherein the machine learning model includes a large language model (LLM), the sequence of inputs includes a sequence of prompts provided to the LLM, and the sequence of outputs includes a sequence of responses generated by the LLM.

18. The non-transitory computer-readable storage medium of claim 16, wherein a first input of the sequence of inputs relates to the file extensions; a second input of the sequence of inputs relates to the file path terms; a third input of the sequence of inputs relates to the directory prefixes; and a fourth input of the sequence of inputs relates to the first input, a first output associated with the first input, the second input, a second output associated with the second input, the third input, and a third output associated with the third input; and wherein the classification is determined based on a fourth output associated with the fourth input.

19. The non-transitory computer-readable storage medium of claim 16, wherein the metadata includes a differential file system metadata (Diff FMD) file.

20. The non-transitory computer-readable storage medium of claim 19, wherein the Diff FMD file is uploaded to a datastore when the snapshot is captured.

* * * * *